US012682743B1

(12) United States Patent
Shi

(10) Patent No.: US 12,682,743 B1
(45) Date of Patent: Jul. 14, 2026

(54) METHOD AND APPARATUS FOR PROVIDING ROAD CONGESTION CAUSE

(71) Applicant: Yinwang Intelligent Technologies Co., Ltd., Shenzhen (CN)

(72) Inventor: Anming Shi, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/971,333

(22) Filed: Oct. 21, 2022

Related U.S. Application Data

(63) Continuation of application No. PCT/CN2020/086794, filed on Apr. 24, 2020.

(51) Int. Cl.
*G08G 1/01* (2006.01)

(52) U.S. Cl.
CPC ......... *G08G 1/0133* (2013.01); *G08G 1/0112* (2013.01)

(58) Field of Classification Search
CPC ........................... G08G 1/0133; G08G 1/0112
See application file for complete search history.

(56) References Cited

U.S. PATENT DOCUMENTS 9,014,954 B2 4/2015 Sato
2011/0228081 A1 9/2011 Masuo
2014/0278032 A1* 9/2014 Scofield ............... G08G 1/0129 701/118
2016/0284212 A1* 9/2016 Tatourian ......... G08G 1/096775
2017/0270413 A1* 9/2017 Moreira-Matias ... G08G 1/0129
2018/0224296 A1 8/2018 Suzuki et al.
2019/0306463 A1 10/2019 Zuckerman et al.
2020/0211373 A1* 7/2020 Ikemoto ............... G08G 1/0137
2021/0174669 A1* 6/2021 Guan ................... G06V 20/584

FOREIGN PATENT DOCUMENTS

CN 103500503 A 1/2014
CN 103578272 A 2/2014
CN 105336173 A 2/2016
CN 105488867 A 4/2016
CN 105489037 A 4/2016
CN 105828020 A 8/2016
CN 105849790 A 8/2016
CN 106323315 A 1/2017
(Continued)

OTHER PUBLICATIONS

English translation of JP-2019179298-A (Year: 2019).*
English translation of CN-109615897-A (Year: 2019).*
English translation of CN-111046212-A (Year: 2020).*

*Primary Examiner* — Navid Z. Mehdizadeh
*Assistant Examiner* — Matthew Ho
(74) *Attorney, Agent, or Firm* — Leydig, Voit & Mayer, Ltd.

(57) ABSTRACT

Determining a congestion point; determining a plurality of vehicles located in a road section of a first predetermined length centered on the congestion point; sending an indication message to the plurality of vehicles, where the indication message indicates the plurality of vehicles to photograph the congestion point by using a vehicle-mounted camera and upload photographed data to the server; receiving the photographed data from the plurality of vehicles; and determining the road congestion cause based on the photographed data.

11 Claims, 7 Drawing Sheets

(56) References Cited

FOREIGN PATENT DOCUMENTS

| | | | | | |
|---|---|---|---|---|---|
| CN | 106355884 | A | | 1/2017 | |
| CN | 106887137 | A | | 6/2017 | |
| CN | 107016872 | A | | 8/2017 | |
| CN | 107529038 | A | | 12/2017 | |
| CN | 107742418 | A | | 2/2018 | |
| CN | 108806256 | A | | 11/2018 | |
| CN | 108846762 | A | | 11/2018 | |
| CN | 108932838 | A | | 12/2018 | |
| CN | 109493614 | A | | 3/2019 | |
| CN | 109615863 | A | | 4/2019 | |
| CN | 109615897 | A | * | 4/2019 | ......... G01C 21/3667 |
| CN | 109910896 | A | | 6/2019 | |
| CN | 110021182 | A | | 7/2019 | |
| CN | 110139073 | A | | 8/2019 | |
| CN | 110473421 | A | | 11/2019 | |
| CN | 111046212 | A | * | 4/2020 | |
| DE | 102017221617 | A1 | | 7/2018 | |
| IN | 201817011886 | A | | 8/2018 | |
| JP | 2006084461 | A | | 3/2006 | |
| JP | 2008065529 | A | | 3/2008 | |
| JP | 2013020523 | A | | 1/2013 | |
| JP | 2013149035 | A | | 8/2013 | |
| JP | 2014228434 | A | | 12/2014 | |
| JP | 2019179298 | A | * | 10/2019 | |
| JP | 2020027400 | A | | 2/2020 | |
| JP | 2020166328 | A | | 10/2020 | |
| KR | 20100119476 | A | | 11/2010 | |
| KR | 101833359 | B1 | | 2/2018 | |
| KR | 20190126024 | A | | 11/2019 | |
| WO | 2007148698 | A1 | | 12/2007 | |
| WO | 2020066656 | A1 | | 4/2020 | |

* cited by examiner

METHOD AND APPARATUS FOR PROVIDING ROAD CONGESTION CAUSE

CROSS-REFERENCE TO RELATED APPLICATIONS

This application is a continuation of International Application No. PCT/CN2020/086794, filed on Apr. 24, 2020, the disclosure of which is hereby incorporated by reference in its entirety.

TECHNICAL FIELD

This application relates to the field of the internet of vehicles, and more specifically, to a method and an apparatus for providing a road congestion cause.

BACKGROUND

Although roads are becoming wider, and intra-city and inter-city highways and expressways are more developed, a growth rate of vehicles is far beyond a bearing capacity of roads. Traffic congestion has become an anxious core problem in cities. For this, a current existing technical solution can recognize congestion and a congestion degree, for example, mark congestion degrees on a map with different colors and depth degrees, but a proportion of long-term congested roads in many cities reaches 60%. Therefore, there is still a lack of further solution to the problem of traffic congestion.

With the emergence of advanced driver assistance systems (ADASs) and vehicle to everything (V2X) technologies, more solutions emerge for vehicle driving problems. The ADAS is a driving assistance system, for example, an in-vehicle navigation system, an adaptive cruise control system, a lane departure warning system, a lane change assistance system, or an anti-collision warning system. The vehicle to everything refers to a communication system between vehicles, between a vehicle and a pedestrian or a rider, and between a vehicle and infrastructure. A vehicle uses various sensors and cameras mounted on the vehicle to obtain a vehicle driving condition and surrounding road environment information, obtains accurate vehicle location information by using a positioning method such as a GPS, and performs end-to-end transmission of the information by using technologies such as short-distance communication and cellular network communication. This implements information sharing in a vehicle to everything system. The ADAS is usually implemented by using a vehicle-mounted device. In addition, a vehicle joins the vehicle to everything by using the vehicle-mounted device, to perform information sharing, and better implements the ADAS based on information sharing.

Currently, a more effective solution for resolving congestion for the vehicle in the vehicle to everything is lacking.

SUMMARY

Embodiments of this application intend to provide a more effective solution for resolving congestion, to resolve a disadvantage in the conventional technology.

To achieve the foregoing objective, a first aspect of this application provides a method for providing a road congestion cause. The method is used in a server and includes: determining a congestion point; determining a plurality of vehicles located in a road section of a first predetermined length centered on the congestion point; sending an indication message to the plurality of vehicles, where the indication message indicates the plurality of vehicles to photograph the congestion point by using a vehicle-mounted camera and upload photographed data to the server; receiving the photographed data from the plurality of vehicles; and determining the road congestion cause based on the photographed data. In this solution, the server indicates the vehicles to perform photographing and upload the photographed data in real time, and determines the congestion cause based on the uploaded photographed data. This can accurately determine the road congestion cause in real time, and improve road traffic efficiency.

In an embodiment, the indicating the plurality of vehicles to photograph the congestion point by using a vehicle-mounted camera includes at least one of the following three items: indicating at least one vehicle located in a road section of a second predetermined length centered on the congestion point to photograph the congestion point by using a front-facing camera, a side-mounted camera, and a rear-facing camera, where the second predetermined length is shorter than the first predetermined length; indicating at least one vehicle located in front of the congestion point to photograph the congestion point by using a rear-facing camera; or indicating at least one vehicle located behind the congestion point to photograph the congestion point by using a front-facing camera. In this embodiment, the server sends different instructions to vehicles at different locations, to instruct the vehicles to use different cameras to photograph a congestion point site, so that all photographed images include the congestion point, and invalid images that do not include the congestion point are reduced, thereby reducing data transmission of the invalid images, reducing communication traffic of a vehicle-mounted device, and accelerating data transmission. In addition, reduction of the invalid images also helps the server to determine, based on the images uploaded by the vehicle-mounted device, a calculation amount, a calculation time, and the like for the congestion cause.

In an embodiment, the photographed data is an image. Compared with a video, the image determined as the photographed data can reduce an amount of the photographed data, reduce the communication traffic of the vehicle-mounted device, and accelerate the data transmission.

In an embodiment, the determining the road congestion cause based on the photographed data includes: inputting the photographed data into a pre-trained first model, and determining the road congestion cause based on an output of the first model. The road congestion cause is determined by using a model instead of being determined manually. This can determine the road congestion cause more quickly and accurately, and improve determining efficiency.

In an embodiment, the first model is an image recognition model, the first model is used to recognize whether the photographed data has at least one of a plurality of predetermined features, the plurality of predetermined features are a set of at least one predetermined feature respectively corresponding to a plurality of predetermined congestion causes, and the determining the road congestion cause based on an output of the first model includes: determining the road congestion cause based on a degree of matching between an output of the image recognition model and at least one predetermined feature corresponding to each predetermined congestion cause. The photographed image is recognized by using the image recognition model, and the congestion cause is determined based on matching between the recognized predetermined feature and the predetermined congestion cause. A structure of the model is simple, and a determining time is short.

In an embodiment, the first model is a congestion cause classification model, and the first model outputs probabilities of a plurality of predetermined congestion causes. The classification model classifies the congestion causes based on a plurality of images and directly outputs a probability of each congestion cause. The model is simple to operate, and an output result of the model is intuitive and easy to use.

In an embodiment, the method further includes: after the determining the road congestion cause based on the photographed data, issuing the road congestion cause. The congestion cause is issued, so that a driver, a person who is about to travel, a traffic supervisor, and the like can conveniently obtain the information in real time. This improves road traffic efficiency, improves traffic supervision efficiency, and helps guide a traveler to select an appropriate travel route.

In an embodiment, the method further includes: after the receiving the photographed data from the plurality of vehicles, determining a congested lane based on the photographed data, and issuing information of the congested lane. The congested lane is determined, so that a vehicle driver can determine a driving route and a driving lane of a vehicle of the vehicle driver, thereby improving road traffic efficiency.

In an embodiment, the road congestion cause is a traffic accident cause, and the method further includes: inputting the photographed data into a second model; performing a traffic accident responsibility identification based on an output of the second model; and issuing the traffic accident responsibility identification. After it is determined that the congestion cause is the traffic accident cause, the traffic accident responsibility identification is performed and the information is issued, so that reference information can be provided for the person concerned, the traffic police, and the like. This helps accelerate a traffic accident processing process, accelerate dispersion in the congestion point, and reduce a congestion time.

A second aspect of this application provides a method for providing a road congestion cause. The method is used in a first vehicle, and the first vehicle is located in a road section of a predetermined length centered on a congestion point. The method includes: receiving an indication message from a server; photographing the congestion point based on the indication message by enabling a vehicle-mounted camera; and sending, to the server based on the indication message, photographed data that is of the congestion point and that is obtained through photographing. A vehicle-mounted device is enabled to perform the method that cooperates with the foregoing method performed by the server, so that the method for providing the road congestion cause according to this application can be implemented, thereby implementing the foregoing beneficial technical effects.

A third aspect of this application provides an apparatus for providing a road congestion cause. The apparatus includes a memory and a processor, where the memory stores a computer program, and the processor is configured to execute the computer program to implement the method for providing the road congestion cause in the first aspect. The apparatus for providing the road congestion cause includes but is not limited to a server, a sub-apparatus in a server, or a chip.

A fourth aspect of this application provides an apparatus for providing a road congestion cause. The apparatus includes a memory and a processor, where the memory stores a computer program, and the processor is configured to execute the computer program to implement the method for providing the road congestion cause in the second aspect. The apparatus for providing the road congestion cause includes but is not limited to a vehicle, a vehicle-mounted device, or a chip.

A fifth aspect of this application provides an apparatus for providing a road congestion cause. The apparatus includes: a first determining unit, configured to determine a congestion point; a second determining unit, configured to determine a plurality of vehicles located in a road section of a first predetermined length centered on the congestion point; a sending unit, configured to send an indication message to the plurality of vehicles, where the indication message indicates the plurality of vehicles to photograph the congestion point by using a vehicle-mounted camera and upload photographed data to a server; a receiving unit, configured to receive the photographed data from the plurality of vehicles; and a third determining unit, configured to determine the road congestion cause based on the photographed data. The apparatus for providing the road congestion cause includes but is not limited to a server, a sub-apparatus in a server, or a chip.

In an embodiment, the indicating the plurality of vehicles to photograph the congestion point by using the vehicle-mounted camera includes at least one of the following three items: indicating at least one vehicle located in a road section of a second predetermined length centered on the congestion point to photograph the congestion point by using a front-facing camera, a side-mounted camera, and a rear-facing camera, where the second predetermined length is shorter than the first predetermined length; indicating at least one vehicle located in front of the congestion point to photograph the congestion point by using a rear-facing camera; or indicating at least one vehicle located behind the congestion point to photograph the congestion point by using a front-facing camera.

In an embodiment, the third determining unit is further configured to: input the photographed data into a pre-trained first model, and determine the road congestion cause based on an output of the first model.

In an embodiment, the first model is an image recognition model, the first model is used to recognize whether the photographed data has at least one of a plurality of predetermined features, and the plurality of predetermined features are a set of at least one predetermined feature respectively corresponding to a plurality of predetermined congestion causes. The third determining unit is further configured to: determine the road congestion cause based on a degree of matching between an output of the image recognition model and at least one predetermined feature corresponding to each predetermined congestion cause.

In an embodiment, the apparatus further includes a first issuing unit, configured to issue the road congestion cause after the road congestion cause is determined based on the photographed data.

In an embodiment, the apparatus further includes: a fourth determining unit, configured to determine, after the photographed data is received from the plurality of vehicles, a congested lane based on the photographed data; and a second issuing unit, configured to issue information of the congested lane.

In an embodiment, the road congestion cause is a traffic accident cause, and the apparatus further includes:

- an input unit, configured to input the photographed data into a second model;

a judgement unit, configured to perform a traffic accident responsibility identification based on an output of the second model; and a third issuing unit, configured to issue the traffic accident responsibility identification.

A sixth aspect of this application provides an apparatus for providing a road congestion cause. A vehicle is located in a road section of a predetermined length centered on a congestion point. The apparatus includes: a receiving unit, configured to receive an indication message from a server; a photographing unit, configured to photograph the congestion point based on the indication message by using a vehicle-mounted camera; and a sending unit, configured to send, to the server based on the indication message, photographed data that is of the congestion point and that is obtained through photographing. The apparatus for providing the road congestion cause includes but is not limited to a vehicle, a vehicle-mounted device, or a chip.

Another aspect of this application provides a computer-readable storage medium, where the computer-readable storage medium stores computer programs or instructions. When the computer programs or the instructions are executed in a computer, an apparatus for providing a road congestion cause is enabled to perform the method for providing the road congestion cause used in the server.

Another aspect of this application provides a computer-readable storage medium, where the computer-readable storage medium stores computer programs or instructions. When the computer programs or the instructions are executed in a computer, an apparatus for providing a road congestion cause is enabled to perform the method for providing the road congestion cause used in the vehicle.

Another aspect of this application provides a computer program product. When the computer program product runs on a processor, an apparatus for providing a road congestion cause is enabled to perform the method for providing the road congestion cause used in the server.

Another aspect of this application provides a computer program product. When the computer program product runs on a processor, an apparatus for providing a road congestion cause is enabled to perform the method for providing the road congestion cause used in the vehicle.

DESCRIPTION OF EMBODIMENTS

The following describes technical solutions of embodiments in this application with reference to accompanying drawings.

Figure 1:
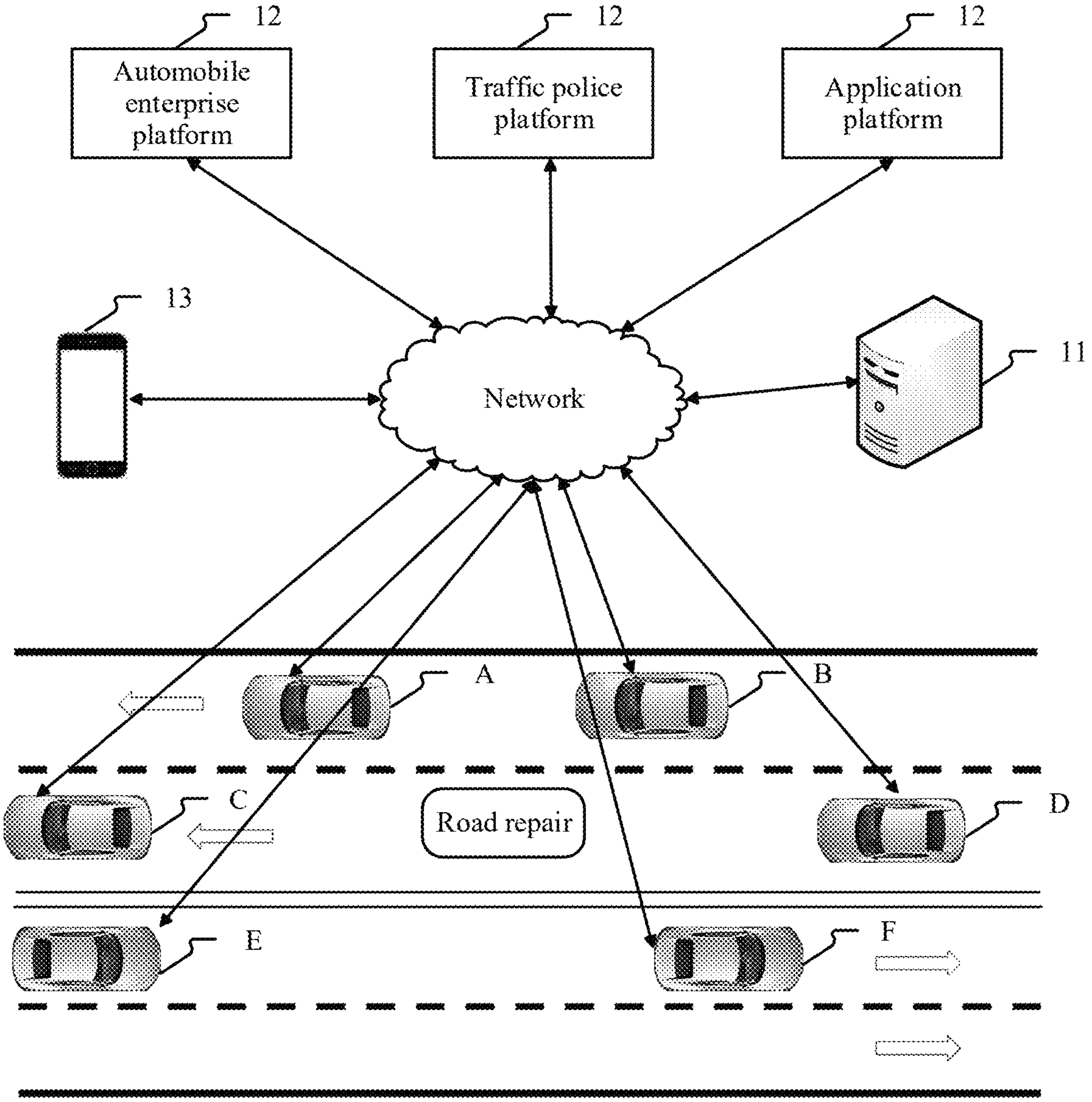
FIG. 1 is a schematic diagram of a system and a scenario for implementing an embodiment of this application.

FIG. 1 is a schematic diagram of a system and a scenario for implementing an embodiment of this application. As shown in FIG. 1, the system for providing a road congestion cause includes a vehicle to everything server 11, network platforms 12, a user terminal device 13, and vehicles A to F. The vehicle to everything server 11 is, for example, a cloud server. The vehicles A to F each have a vehicle-mounted device to join a vehicle to everything and to assist driving. As shown in the figure, the network platforms 12 include, for example, an automobile enterprise platform, a traffic police platform, and another application platform. When there is a congestion point caused by road repair on a road shown in the figure, vehicle speeds on two leftward lanes in the figure decrease and the vehicles are congested. After determining, based on information in a network, that congestion occurs on the leftward road of a road section in the figure, the vehicle to everything server 11 determines a congestion point in the road section, and determines, based on positioning information of each vehicle in the vehicle to everything, that the vehicles A to F are located in road sections of a predetermined length in front of and behind the congestion point. The vehicle to everything server 11 indicates the vehicle-mounted devices in the vehicles A to F to enable a camera to perform photographing and upload photographed data. After receiving the photographed data from the vehicles A to F, the vehicle to everything server 11 determines, based on the photographed data, that the congestion cause is road repair construction, and issues the congestion cause to the network. For example, the vehicle to everything server 11 marks the congestion cause on a map of a vehicle to everything platform of the vehicle to everything server 11, or sends the congestion cause to another server corresponding to the network platform 12. The user terminal 13 may receive, for example, the information on the congestion cause from the vehicle to everything platform, so that a user can better plan a travel route of the user based on the information. The another platform may also receive the information on the congestion cause from the vehicle to everything server 11 and issue the information.

Figure 2:
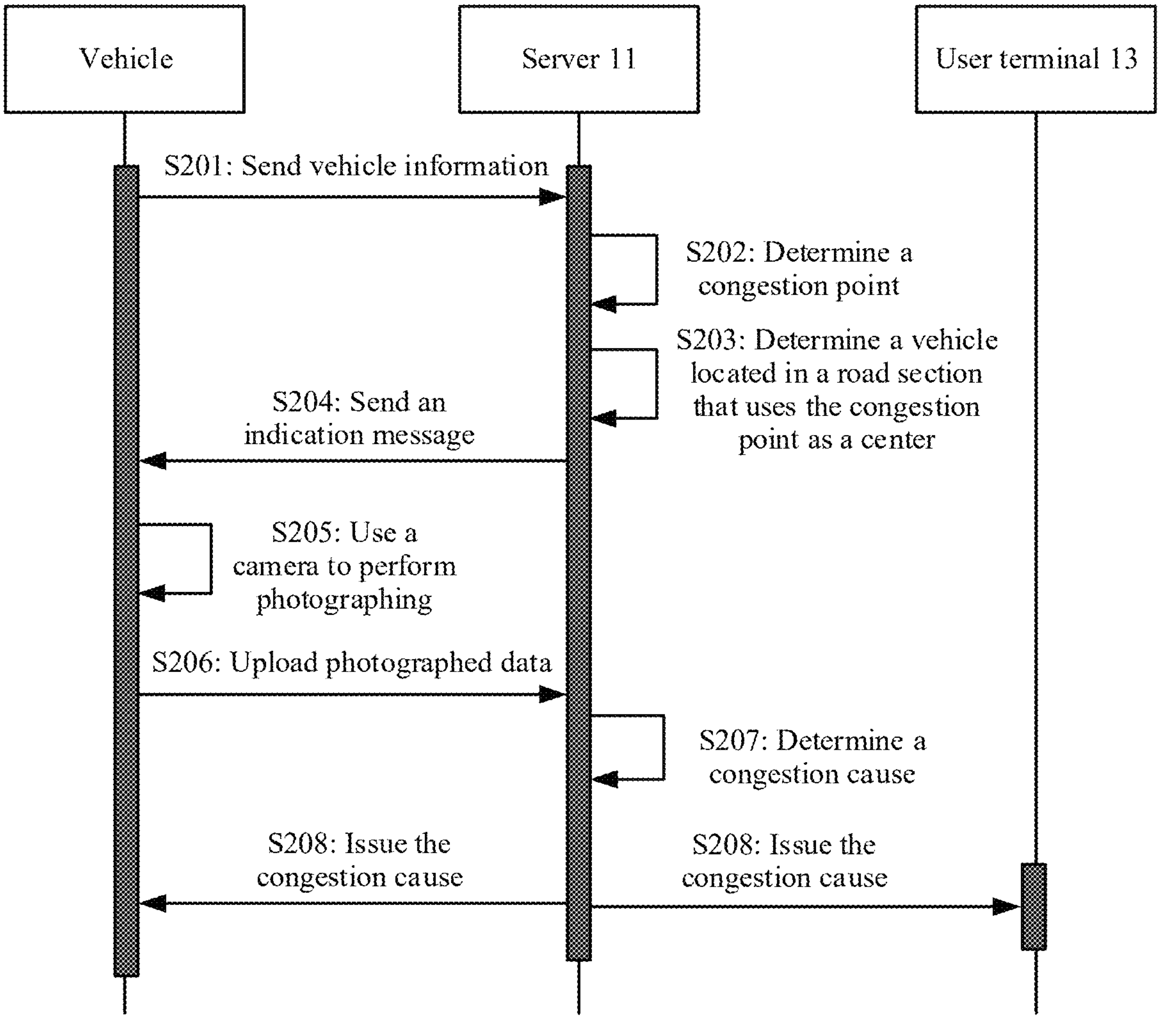
FIG. 2 is a flowchart of a method for providing a road congestion cause according to an embodiment of this application.

FIG. 2 is a flowchart of a method for providing a road congestion cause according to an embodiment of this application.

As shown in FIG. 2, in step S201, a vehicle (for example, the vehicles A to F in FIG. 1) may send location information, speed information, and the like of the vehicle to a server 11 (namely, the vehicle to everything server 11) by using a vehicle-mounted device of the vehicle during driving. The vehicle-mounted device may obtain location information of the vehicle through a positioning system included in the vehicle-mounted device, may obtain a speed of the vehicle by using a speed sensor included in the vehicle-mounted device, and may send the latest location information and speed information to the server 11 at a predetermined time interval by using a mobile communication module included in the vehicle-mounted device.

In step S202, the server 11 determines a road congestion point.

The server 11 may first determine a congested road section on an urban road. In an embodiment, the server 11 may determine the congested road section based on vehicle information received from each driving vehicle. For example, the server 11 may determine, based on speed information of each vehicle, whether a driving speed of a vehicle on a road section is significantly lower than a designed road speed. For example, if a driving speed on a highway section is 10 km/h to 40 km/h, or if a driving speed on an urban road section is 5 km/h to 30 km/h, it may be determined that the driving speeds on the two road sections are significantly lower than the designed speed, and the two road sections may be determined as congested road sections. It may be understood that the server 11 is not limited to determining the congested road section on a road as described above. The server 11 may also query the congested road section through another network platform. For example, the server 11 may query a real-time road condition mark on the navigation map. When it is recognized that a traffic condition of a related road on the navigation map becomes red or yellow; it may be determined that congestion occurs on the road section.

After determining the congested road section, the server 11 may determine, based on road condition data, static data, and the like of the congested road section, a location point that causes congestion in the congested road section as the congestion point of the road section. For example, the server 11 determines the congestion point based on a vehicle speed at each point on the congested road section, and determines the congestion point based on a junction point of red, yellow, and green in the congested road section in a real-time road condition. For example, referring to FIG. 1, the server 11 may determine, based on road condition data in the leftward road section in FIG. 1, that a congestion point in the leftward road section is a location including a "road repair" mark box.

In step S203, the server 11 determines a vehicle located in a road section of a predetermined length centered on the congestion point.

After determining the congestion point in the road section, the server 11 obtains location information of the congestion point. Then, location information of the road section of the predetermined length that uses the congestion point as the center may be determined. The location information of the road section of the predetermined length includes, for example, a start point location of the road section and an end point location of the road section. For example, the predetermined length is preset to 600 meters, that is, the road section is a road section that uses the congestion point as the center and that is from 300 meters in front of the congestion point to 300 meters behind the congestion point. It may be understood that 600 meters herein are merely used as an example for description, but are not intended to limit this embodiment of this application. In practice, the predetermined length may be determined based on factors such as a configuration of a vehicle camera, atmospheric visibility, and the like.

Then, the server 11 may determine, based on latest or current location information sent from each vehicle, which vehicles are currently located in the determined road section.

In an embodiment, the 600-meter road section includes only a unidirectional lane, and the server 11 determines all driving vehicles in the road section.

In an embodiment, the 600-meter road section includes a bidirectional lane. As shown in FIG. 1, the 600-meter road section includes a leftward lane and a rightward lane. The server 11 determines only a vehicle in a lane direction in which the congestion point is located in the road section. In other words, as shown in FIG. 1, the server 11 determines only a vehicle driving leftward in the road section. In this embodiment, for example, as shown in FIG. 1, the server 11 may determine that the vehicles A to D are vehicles located in the 600-meter road section.

In an embodiment, the 600-meter road section includes a bidirectional lane. The server 11 determines all vehicles in the road section, that is, not only determines the vehicles A to D that travel leftward in FIG. 1, but also determines the vehicles E and F that travel on the rightward lane in FIG. 1.

In step S204, the server 11 sends an indication message to the determined vehicle.

The indication message indicates the corresponding vehicle to perform photographing by using a camera, and return a photographed image or video to the server 11. The indication message is, for example, in a form of an instruction.

In an embodiment, the server 11 may send a same instruction to all the determined vehicles, where the instruction instructs a corresponding vehicle-mounted device to perform photographing by using all cameras or all high-definition cameras, and return all photographed data to the server 11.

In an embodiment, the server 11 may determine a location of the vehicle relative to the congestion point based on a location of the determined vehicle, and then correspondingly send the instruction based on the determined relative location of the vehicle. Specifically, a relative location determining rule may be first preset. For example, it may be preset that if the vehicle is 5 meters away in front of the congestion point in the driving direction of the vehicle, it may be determined that the vehicle is located in front of the congestion point: if the vehicle is 5 meters away behind the congestion point in the driving direction of the vehicle, it may be determined that the vehicle is located behind the congestion point: or if the vehicle is located in a 10-meter road section centered on the congestion point, it may be determined that the vehicle is near the congestion point. It may be understood that the determining rule is not limited herein. For example, for a vehicle near the congestion point, which side of the vehicle is opposite to the congestion point may be determined. For example, it may be preset that if the vehicle is located in front of the congestion point in the traveling direction of the vehicle, it may be determined that the vehicle is located in front of the congestion point: or if the vehicle is located behind the congestion point in the traveling direction of the vehicle, it may be determined that the vehicle is located behind the congestion point. For example, it may be preset that if the vehicle is located in a 5-meter road section centered on the congestion point, it may be determined that the vehicle is near the congestion point.

Then, a relative location of each determined vehicle may be determined according to the foregoing rule. Referring to FIG. 1, as described above, when it is determined that the vehicles A to D in FIG. 1 are vehicles in the 600-meter road section, it may be determined that the vehicle C is located in front of the congestion point, the vehicle A and the vehicle B are near the congestion point, and the vehicle D is located behind the congestion point. More specifically, it may be further determined that left sides of the vehicle A and the vehicle B are opposite to the congestion point. When it is determined that the vehicles A to F in FIG. 1 are the vehicles in the 600-meter road section, in addition to determining relative locations of the vehicles A to D, it may be further determined that the vehicle E is behind the congestion point and the vehicle F is near the congestion point. More specifically, it may be further determined that a left side of the vehicle F is opposite to the congestion point.

After determining the relative location of each determined vehicle, the server 11 may correspondingly send an instruction based on the relative location of each determined vehicle. An instruction may be sent to the vehicle C to instruct a vehicle-mounted device of the vehicle C to photograph the congestion point by using a rear-facing camera. An instruction may be sent to the vehicle A and the vehicle B to instruct vehicle-mounted devices of the vehicles A and the vehicle B to photograph the congestion point by using all cameras, or to photograph the congestion point by using front-facing cameras, left-facing cameras, and rear-facing cameras. An instruction may be sent to the vehicle D to instruct a vehicle-mounted device of the vehicle D to photograph the congestion point by using a front-facing camera.

When the vehicle E and the vehicle F are also determined as vehicles in the 600-meter road section, the server 11 may send an instruction to the vehicle E to instruct a vehicle-mounted device of the vehicle E to photograph the congestion point by using a front-facing camera of the vehicle E, and the server 11 may send an instruction to the vehicle F to instruct a vehicle-mounted device of the vehicle F to photograph the congestion point by using all cameras, or to photograph the congestion point by using a front-facing camera, a left-facing camera, and a rear-facing camera.

An instruction sent by the server 11 to a determined vehicle may instruct a camera of a vehicle-mounted device to continuously photograph an image at a predetermined frequency within a predetermined time length, for example, capture an image every 5 seconds within 2 minutes. It may be understood that, in this embodiment of this application, the instruction is not limited to the description herein. For example, the instruction may also instruct the camera to photograph a video consecutively for three minutes.

It may be understood that instructions sent by the server 11 to a plurality of determined vehicles are not limited to the foregoing various instructions, and may include at least one of the following three instructions: an instruction 1, for instructing at least one vehicle located in, for example, a 10-meter road section centered on the congestion point to photograph the congestion point by using a front-facing camera, a side-mounted camera, and a rear-facing camera; an instruction 2, for instructing at least one vehicle located in front of the congestion point to photograph the congestion point by using a rear-facing camera; and an instruction 3, for instructing at least one vehicle located behind the congestion point to photograph the congestion point by using a front-facing camera. For example, if the server 11 determines that all vehicles in the 600-meter road section are behind the congestion point, the server 11 sends the instruction 3 to the plurality of determined vehicles. If the server 11 determines that all vehicles in the 600-meter road section are in front of the congestion point, the server 11 sends the instruction 2 to the plurality of determined vehicles. If the server 11 determines that all vehicles in the 600-meter road section are near and in front of the congestion point, the server 11 sends the instruction 1 and the instruction 2 to the plurality of determined vehicles.

In step S205, the vehicle uses a camera to perform photographing.

The vehicle-mounted device in the vehicle may perform an operation on the camera based on specific content of the instruction. For example, as described above, the vehicle-mounted device of the vehicle C photographs the congestion point by using the rear-facing camera based on the instruction received by the vehicle-mounted device. Photographing is, for example, consecutively photographing an image every 5 seconds within 2 minutes. The vehicle-mounted device of the vehicle A or the vehicle B photographs the congestion point by using the front-facing camera, the side-mounted camera, and the rear-facing camera according to the instruction received by the vehicle-mounted device. The vehicle-mounted device of the vehicle D photographs the congestion point by using the front-facing camera according to the instruction received by the vehicle-mounted device. The vehicle-mounted device of the vehicle E photographs the congestion point by using the front-facing camera according to the instruction received by the vehicle-mounted device, and the vehicle F photographs the congestion point by using the front-facing camera, the side-mounted camera, and the rear-facing camera according to the instruction received by the vehicle F.

In step S206, the vehicle uploads the data photographed by the vehicle to the server 11.

The vehicle-mounted device in the vehicle may, for example, connect to a network by using a mobile communication module included in the vehicle-mounted device, and upload the photographed data to the server 11.

In step S207, the server 11 determines a congestion cause based on the photographed data.

The server 11 may input the photographed data into a pre-trained model, to determine the congestion cause based on an output of the model. In an embodiment, the pre-trained model is, for example, an image recognition model. In the server 11, after the photographed data is input into the image recognition model, the model recognizes whether the photographed data includes an element of a plurality of predetermined elements (features), where the plurality of predetermined elements are a set of at least one predetermined element respectively corresponding to a plurality of predetermined congestion causes; and determines the road congestion cause based on a degree of matching between an output of the image recognition model and the at least one predetermined element corresponding to each predetermined congestion cause.

In an embodiment, the pre-trained model is, for example, a congestion cause classification model. The model outputs probabilities of the plurality of predetermined congestion causes, and determines the congestion cause based on the probabilities of the congestion causes.

In step S208, the server 11 issues the congestion cause of the congestion point.

In an embodiment, when obtaining, through prediction, that a vehicle is about to pass the congestion point, the server 11 may indicate a vehicle-mounted device of the vehicle to use a loudspeaker to send a voice notification to a user driving the vehicle.

Figure 3:
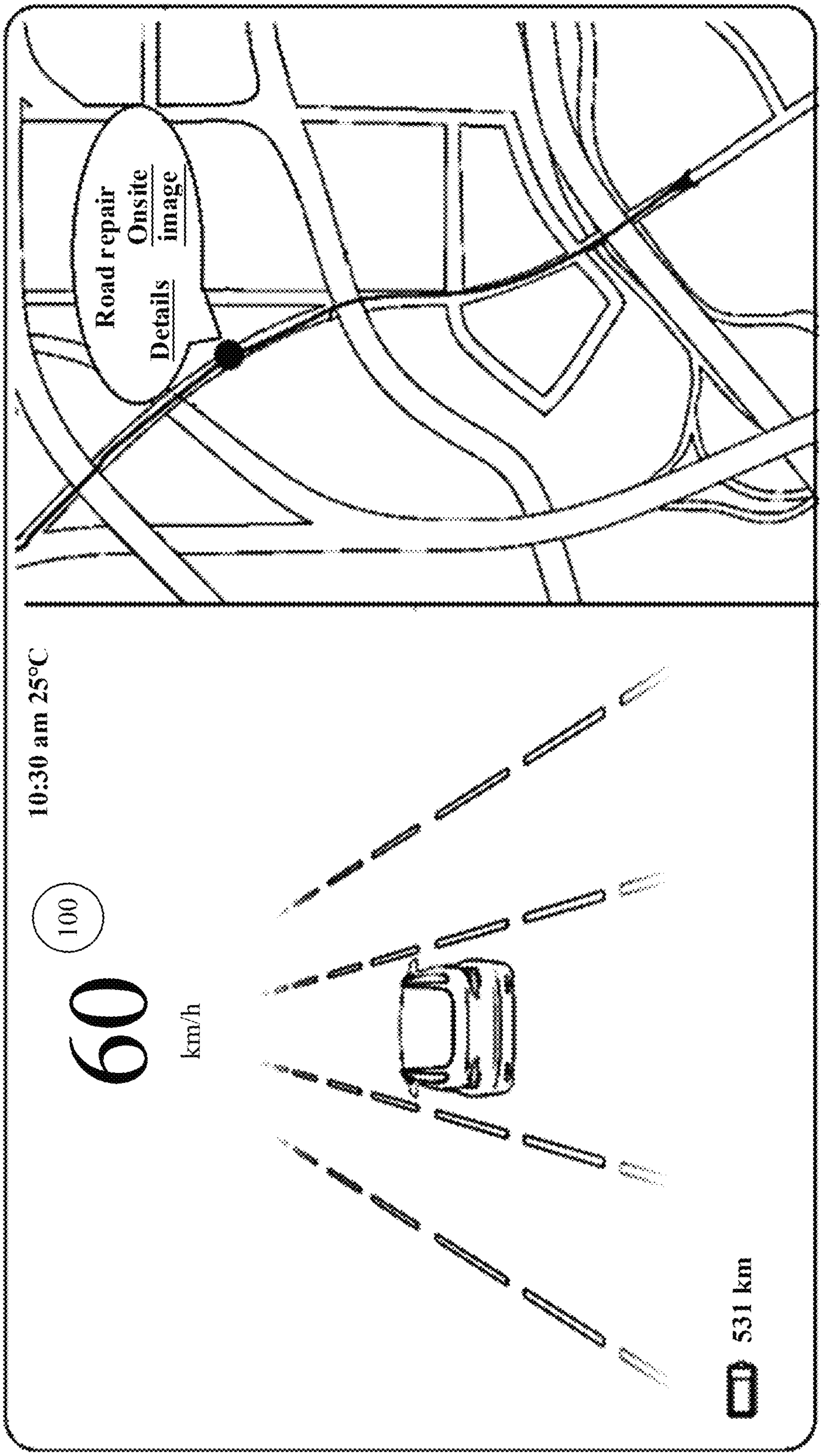
FIG. 3 is a schematic diagram of prompting a congestion point and a congestion cause on a navigation map.

In an embodiment, the server 11 may prompt the congestion point and the congestion cause of the congestion point on a navigation map or a city map. FIG. 3 is a schematic diagram of prompting the congestion point and the congestion cause on the navigation map. As shown in FIG. 3, an image shown in the figure may be displayed on a display of the vehicle-mounted device of the vehicle, or may be displayed on a screen of the user terminal device 13. The vehicle-mounted device or the terminal device 13 is connected to the server 11 by using a network, so that information such as the navigation map issued by the server 11, the congestion point, and the congestion cause may be displayed on the screen. A solid line in the center of a road is a planned driving route of the vehicle, a black arrow is a navigation vehicle location, and a black circle is an identifier of the congestion point. Above the congestion point, a bubble indicates that the congestion cause of the congestion point is the "road repair" cause. In addition, the bubble further includes a "details" button and an "onsite image" button, so that a user can click the "details" button to further learn details. The details include, for example, a congested lane, a predicted congestion end time. In addition, the user may click the "onsite image" button to intuitively learn an onsite situation of the congestion point, and determine the congestion situation based on an onsite image.

In an embodiment, the server 11 may perform, at a predetermined frequency, the steps performed by the server 11 in FIG. 2, to update information issued by the server 11 at a predetermined frequency. For example, after determining the congestion point and the congestion cause shown in FIG. 3, the server 11 may determine again, for example, every five minutes, whether the congestion point is still the congestion point. When the congestion point is no longer the congestion point, this information is updated in the map; or when the congestion point is still the congestion point, the details, onsite image information, and the like of the congestion point are updated, so that the user can obtain new (basically real-time) information.

In the navigation map, as shown in FIG. 3, the congestion cause is prompted for the user driving the vehicle, so that the user decides a driving route of the user based on more comprehensive information, thereby improving driving experience of the user. For example, if the congestion cause is road repair, the user may determine, based on a detailed prompt in the map or determining of the user, that the congestion point is not cleared in a short time. Therefore, the user changes to another driving route in time. If the congestion cause is road sweeping, the user may determine that the congestion point is cleared soon. Therefore, the user may continue the original driving route of the user.

When enabling city map information before traveling, the user may plan an appropriate travel route in advance based on the congestion point and the congestion cause information in the city map information.

In addition, a traffic supervisor may perform traffic dispersion based on the congestion cause issued by the server 11, thereby improving traffic dispersion efficiency.

In an embodiment, when the server 11 determines that the congestion cause is a traffic accident cause, the server 11 may further input the photographed image received from the vehicles into a pre-trained traffic accident responsibility identification model to perform traffic accident responsibility identification, and display, for example, the traffic accident responsibility identification in content corresponding to the "details" button in FIG. 3, for reference by a traffic accident party involved or a traffic police. This helps accelerate a traffic accident processing process, accelerate dispersion to the congestion point, and reduce congestion time.

In an embodiment, when or after determining the congestion cause based on the plurality of photographed images, the server 11 may further recognize an occupation status of a lane based on the plurality of photographed image, for example, recognize a congested lane in the road section by using the image recognition model.

In an embodiment, when determining the congestion cause, the server 11 may further predict a congestion end time by using a model or according to a predetermined rule.

It may be understood that although image photographing is used as an example for description above, this embodiment of this application is not limited thereto. For example, the vehicle-mounted device may also photograph a short video and upload the short video to the server, where the video is a set of images. Therefore, the foregoing method is also applicable to video photographing.

Figure 4:
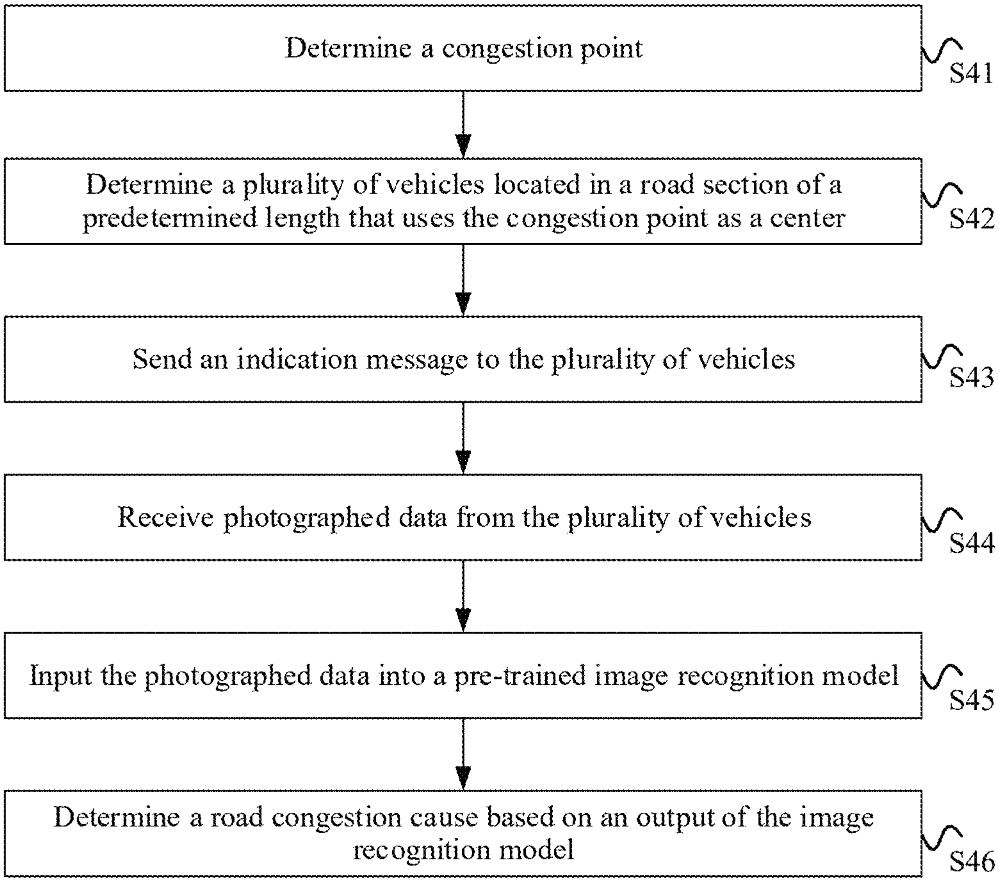
FIG. 4 is a flowchart of another method for providing a road congestion cause according to an embodiment of this application.

FIG. 4 is a flowchart of another method for providing a road congestion cause according to an embodiment of this application. The method is used in a server, and includes the following steps.

Step S41: Determine a congestion point.

Step S42: Determine a plurality of vehicles located in a road section of a predetermined length centered on the congestion point.

Step S43: Send an indication message to the plurality of vehicles, where the indication message indicates the plurality of vehicles to photograph the congestion point by using a vehicle-mounted camera and upload photographed data to the server.

Step S44: Receive the photographed data from the plurality of vehicles.

Step S45: Input the photographed data into a pre-trained image recognition model.

Step S46: Determine the road congestion cause based on an output of the image recognition model.

For steps S41 to S44, refer to the foregoing descriptions of steps S202, S203, S204, and S206. Details are not described herein again.

In step S45, the server 11 inputs the photographed data into the pre-trained image recognition model, and recognizes, by using the image recognition model, a plurality of photographed images received from vehicle-mounted devices of the vehicles, to recognize whether the plurality of photographed images include at least one predetermined element in a predetermined element (namely, predetermined feature) set.

Optionally, after receiving the plurality of photographed images from the vehicle-mounted devices, the server 11 first screens the plurality of photographed images, to remove an image irrelevant to the congestion point. The screening is, for example, specifically, performing image recognition on these images, and removing an image that does not include an image of the congestion point.

The predetermined element set includes a plurality of elements corresponding to a plurality of preset congestion causes. For example, four congestion causes may be preset: a traffic accident, road repair, greening/sweeping, and city arrangement. Predetermined elements corresponding to the traffic accident cause include: (1) The plurality of vehicles stop. (2) Heads of the plurality of vehicles form an angle between with a road direction. (3) A person stands on a motor vehicle lane. Predetermined elements corresponding to the road repair cause include: (4) The lane becomes narrow. (5) There is a blocking wall. (6) There is construction traffic sign. (7) The plurality of vehicles change lanes at a same place. Predetermined elements corresponding to the greening/sweeping cause include: (8) An engineering vehicle slowly drives through. (9) There is a construction traffic cone corridor. Predetermined elements corresponding to the city arrangement cause include: (8) The engineering vehicle slowly drives through. (10) There are city-arranged objects (such as flags and lanterns). Therefore, the predetermined element set may include the predetermined elements (1) to (10).

The image recognition model may be trained by using the 11 predetermined elements corresponding to a training sample set. For example, a training sample in the training sample set is an image including at least one predetermined element in the 11 predetermined elements, and a label value of the training sample is an identifier of the predetermined element included in the image. Therefore, the image recognition model is trained by using a plurality of such training samples, so that the image recognition model can recognize whether an image includes at least one of the predetermined elements (1) to (10).

Therefore, after the image recognition model is trained as described above, the server 11 may recognize, by using the image recognition model, whether any image includes the at least one predetermined element.

In an embodiment, the plurality of to-be-recognized photographed images may be superimposed into one image, and the superimposed image is input into the image recognition model, to recognize whether the plurality of photographed images include the at least one predetermined element. In an embodiment, the plurality of to-be-recognized photographed images may be separately input into the image recognition model to separately recognize the plurality of to-be-recognized photographed images. If a photographed image input into the image recognition model includes at least one of the foregoing 10 predetermined elements, the image recognition model outputs, for example, an element identifier of the recognized at least one element, so that predetermined elements included in the plurality of photographed images can be recognized based on the output of the image recognition model.

In step S46, the server 11 determines the road congestion cause based on the output of the image recognition model, that is, determines the congestion cause based on a recognized predetermined element.

The server 11 may input, into a predetermined determining model, each predetermined element identifier that is output from the image recognition model for each selected photographed image, to determine a congestion cause ranking according to a predetermined rule. For example, a percentage of a quantity of elements corresponding to each congestion cause in the output predetermined elements to all elements of the congestion cause may be determined, to determine a recommended ranking of each congestion cause based on the percentage. For example, the image recognition model inputs the following elements to the determining model in total: (1), (2), (3), (4), (5), (6) and (9). The predetermined determining model may determine, based on these input elements, a percentage of elements corresponding to the traffic accident cause in the input elements to all elements of the cause is 100%, a percentage of elements corresponding to the road repair cause in the input elements to all elements of the cause is 75%, a percentage of elements corresponding to the greening/sweeping cause in the input elements to all elements of the cause is 50%, and a percentage of elements corresponding to the city arrangement cause in the input elements to all elements of the cause is 0. Therefore, it may be determined that the recommended ranking of congestion causes is: the traffic accident cause>the road repair cause>the greening/sweeping cause>the city arrangement cause.

After determining the congestion cause ranking, the server 11 may determine a congestion cause that ranks first as the congestion cause corresponding to the plurality of photographed images. In an embodiment, after determining the congestion cause ranking, the server 11 may determine the final congestion cause according to an indication of the service personnel.

Figure 5:
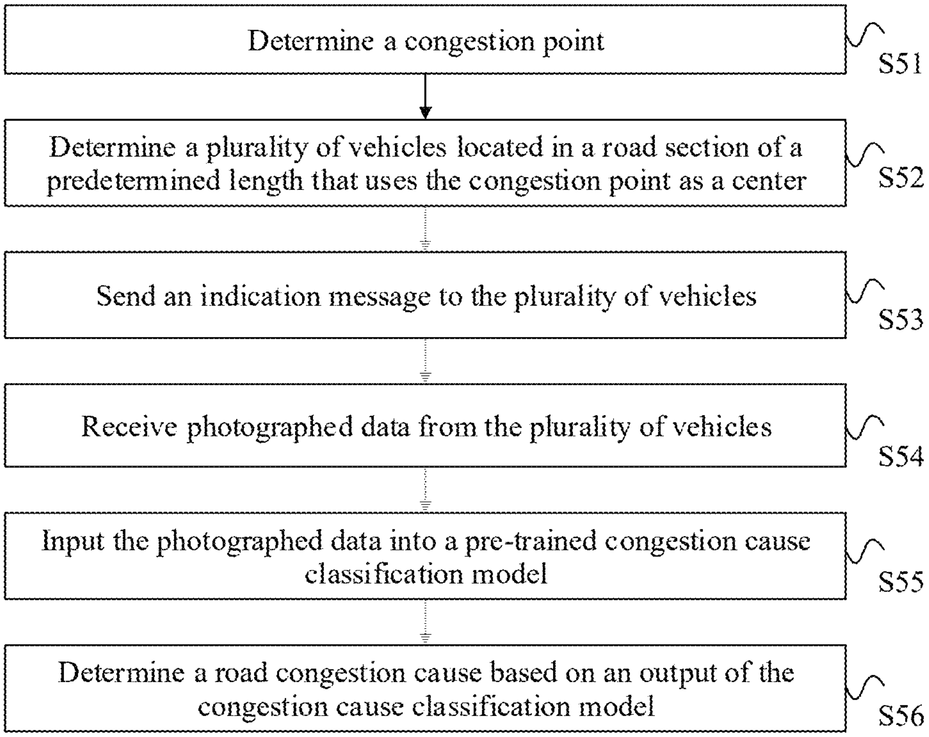
FIG. 5 is a flowchart of still another method for providing a road congestion cause according to an embodiment of this application.

FIG. 5 is a flowchart of still another method for providing a road congestion cause according to an embodiment of this application. The method is used in a server, and includes the following steps.

Step S51: Determine a congestion point.

Step S52: Determine a plurality of vehicles located in a road section of a predetermined length centered on the congestion point.

Step S53: Send an indication message to the plurality of vehicles, where the indication message indicates the plurality of vehicles to photograph the congestion point by using a vehicle-mounted camera and upload photographed data to the server.

Step S54: Receive the photographed data from the plurality of vehicles.

Step S55: Input the photographed data into a pre-trained congestion cause classification model.

Step S56: Determine the road congestion cause based on an output of the congestion cause classification model.

For steps S51 to S54, refer to the foregoing descriptions of steps S202, S203, S204, and S206. Details are not described herein again.

In step S55, the server 11 inputs the photographed data into the pre-trained congestion cause classification model. For example, the server 11 inputs a plurality of photographed images received from the vehicle-mounted devices into the pre-trained congestion cause classification model.

Optionally, after receiving the plurality of photographed images from the vehicle-mounted devices, the server 11 first screens the plurality of photographed images, to remove an image irrelevant to the congestion point, and then inputs a plurality of remaining photographed images after screening into the pre-trained congestion cause classification model.

In this embodiment, similar to the foregoing description, for example, four congestion causes may be preset: ① a traffic accident, ② road repair, ③ greening/sweeping, and ④ city arrangement. The congestion cause classification model is, for example, a classification model based on a convolutional neural network (CNN). An image may be input into the congestion cause classification model, and recognition processing is performed on the image to classify the image. The congestion cause classification model may be trained for the foregoing four congestion causes by using training samples. For example, each training sample includes a plurality of onsite images corresponding to one congestion cause, and a label value of each training sample is used to indicate a congestion cause corresponding to the plurality of onsite images included in the training sample. For example, if the congestion cause corresponding to the training sample is the cause ③ greening/sweeping, the label value of the training sample may be represented as a vector (0, 0, 1, 0), and four elements in the vector correspond to the four causes in a sequence, where 1 indicates that a probability of a corresponding cause is 100%, and 0 indicates that a probability of a corresponding cause is 0. When congestion occurs, the plurality of onsite images are collected at the congestion point, and the congestion cause corresponding to the plurality of onsite images is manually labeled, so as to obtain the training sample.

After the congestion cause classification model is trained by using the plurality of training samples, and after the plurality of to-be-predicted photographed images are input into the model, the model outputs probabilities of the four causes. A higher probability indicates a higher probability of a corresponding cause.

In step S56, the server 11 determines the congestion cause based on an output of the congestion cause classification model.

As described above, after the plurality of images are input into the congestion cause classification model, the congestion cause classification model outputs a probability of each congestion cause, so that congestion causes may be sorted based on a value of the probability of each cause. In an embodiment, a congestion cause with the largest output probability value may be determined as the congestion cause corresponding to the plurality of photographed images. In an embodiment, after determining the congestion cause ranking, the server 11 may determine the final congestion cause according to an instruction of the service personnel.

Figure 6:
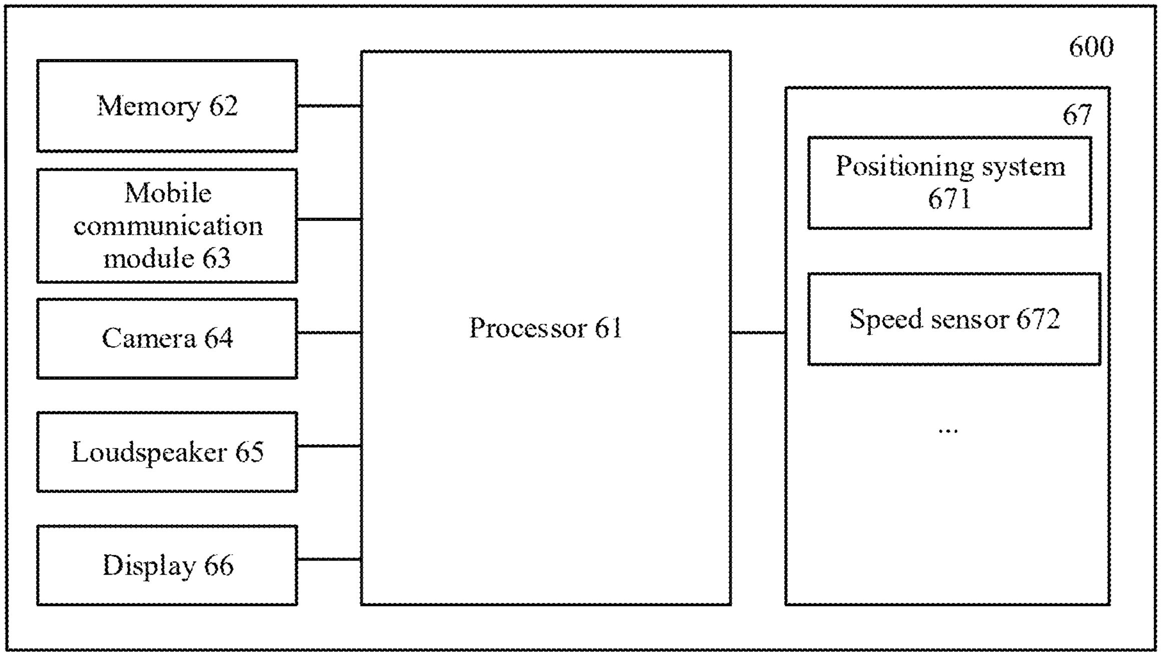
FIG. 6 is a schematic diagram of a structure of a vehicle-mounted device according to this application.

FIG. 6 is a schematic diagram of a structure of a vehicle-mounted device 600 according to this application. As shown in FIG. 6, the vehicle-mounted device 600 includes a processor 61, a memory 62, a mobile communication module 63, a camera 64, a loudspeaker 65, a display 66, and a sensor module 67. The sensor module 67 includes, for example, a positioning system 671 and a speed sensor 672.

The processor 61 may include one or more processing units. Different processing units may be independent components, or may be integrated devices.

The memory 62 may be configured to store computer-executable instructions, for example, may store an operating system program and an application. The memory may be a volatile memory, such as a random access memory (RAM); or the memory may be a non-volatile memory, such as a read-only memory (ROM), a flash memory, a hard disk drive (HDD), or a solid-state drive (SSD); or the memory may include a combination of the foregoing types of memories. The processor 61 runs the instructions stored in the memory 62, to perform various function applications of the vehicle-mounted device 600 and data processing. For example, in the vehicle-mounted device 600, a plurality of applications, such as a navigation application, a notification application, and the like, may be run by using the processor 61. For example, an instruction used to perform the method for providing the congestion cause according to this application may be included in the operating system program or a specific application of the vehicle-mounted device 600, so that when executing the instruction, the processor may perform the solution for providing the road congestion cause according to this application.

The mobile communication module 63 may provide, for example, mobile communication such as 2G/3G/4G/5G. The vehicle-mounted device 600 may be connected to a network by using the mobile communication module 63 and by using a mobile communication base station, to communicate with a vehicle-to-everything server or another vehicle-mounted device, and may receive information from the vehicle-to-everything server through the plurality of applications, for example, receive a new message, a map identifier, and the like that are sent by the vehicle-to-everything server. It may be understood that the vehicle-mounted device may further include a wireless communication module (not shown), and the wireless communication module may provide a wireless communication solution including a WLAN, such as a Wi-Fi network, Bluetooth, NFC, IR, and the like. Therefore, the vehicle-mounted device 600 may also access a network by using the wireless communication module.

The positioning system 671 is, for example, a positioning system based on a GPS, or may be a positioning system based on a mobile communication base station. The speed sensor 672 is configured to obtain a traveling speed of a vehicle. The vehicle-mounted device 600 may obtain positioning information from the positioning system 671 and speed information from the speed sensor 672, and may send the information to the vehicle-to-everything server 11 by using the mobile communication module 63. The vehicle-to-everything server 11 may determine a congestion point on a road based on positioning information and speed information from a plurality of vehicles, and indicate a vehicle-mounted device near the congestion point to photograph the congestion point by using a camera.

The vehicle-mounted device 600 is connected to the camera 64, so that after receiving the indication from the vehicle-to-everything server 11, the vehicle-mounted device 600 may use the camera 64 to perform photographing, obtain image or video data photographed by the camera 64, and send the video data to the vehicle-to-everything server 11, so that the vehicle-to-everything server 11 determines the road congestion cause. The camera 64 may include, for example, at least one camera, for example, may include a front-facing camera located in front of a vehicle, a rear-facing camera located in the rear of the vehicle, and side-mounted cameras located on two sides of a vehicle body. The camera may further include a plurality of lens configurations, for example, may include a high-definition camera.

Figure 7:
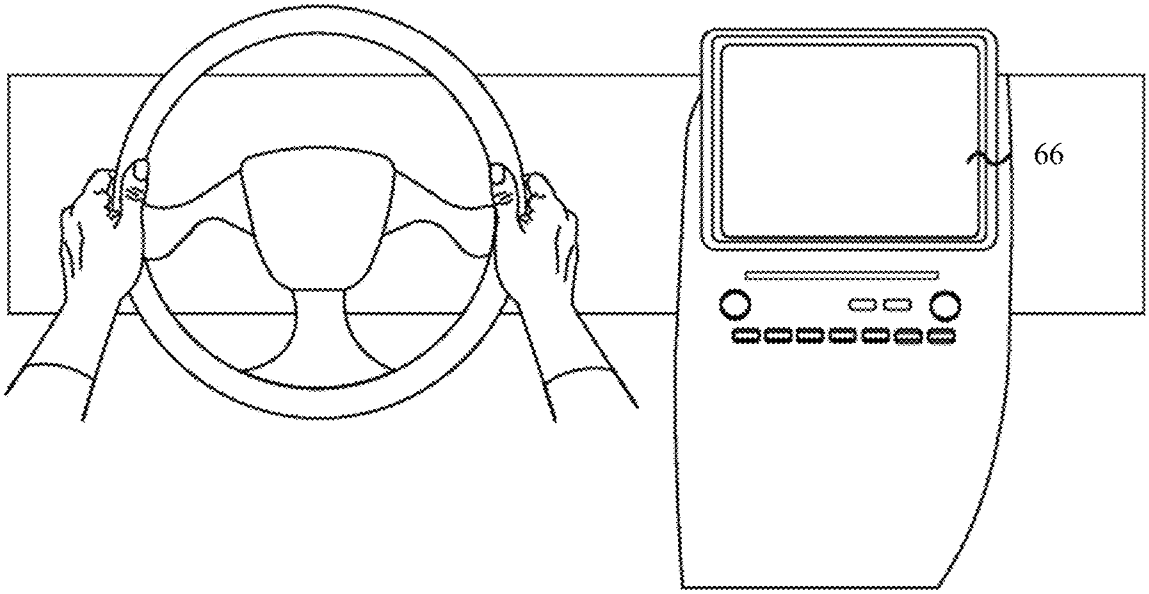
FIG. 7 is a schematic diagram of a display of a vehicle-mounted device.

After determining the road congestion cause, the vehicle-to-everything server 11 may issue the congestion cause, so that the vehicle-mounted device 600 may receive information on the congestion cause. For example, the congestion cause may be prompted at a location of the congestion point on a map by using the navigation application on the display 66. FIG. 7 is a schematic diagram of the display 66 of the vehicle-mounted device 600. Alternatively, the vehicle-to-everything server 11 may invoke, by the notification application, the loudspeaker 65 to provide a voice prompt. In addition, the vehicle-to-everything server 11 may also prompt a user by using a corresponding application in the user terminal device 13.

Figure 8:
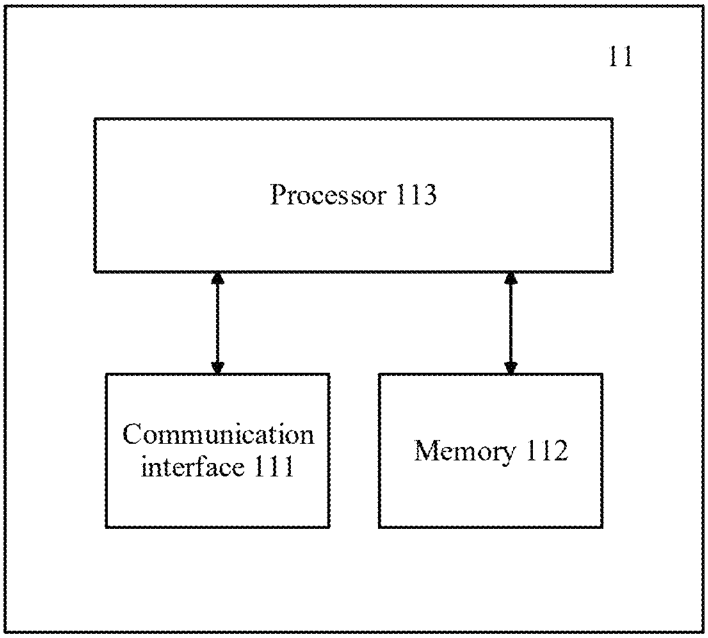
FIG. 8 is a schematic diagram of a vehicle to everything server according to an embodiment of this application.

FIG. 8 is a schematic diagram of the server 11 according to an embodiment of this application. The server 11 includes a communication interface 111, a memory 112, and a processor 113.

The communication interface 111 is used to communicate with a device outside the vehicle-to-everything server.

The memory 112 stores a computer program, and when executing the computer program, the processor 113 implements the steps performed by the server 11 in the method shown in FIG. 2.

The memory 112 may be configured to store a software program and a module. The processor 113 runs the software program and the module stored in the memory 82, so that the server 11 performs the steps performed by the server 11 in the method shown in FIG. 2. The memory 112 may mainly include a program storage area and a data storage area. The program storage area may store an operating system, an application by performing the foregoing method, and the like. The data storage area can store a configuration file of the application, and the like. In addition, the memory 112 may be a volatile memory, such as a random access memory (RAM); or the memory 112 may be a non-volatile memory, such as a read-only memory (ROM), a flash memory, a hard disk drive (HDD), or a solid-state drive (SSD); or the memory 112 may include a combination of the foregoing types of memories.

The processor 113 is a control center of the server 11, and is connected to all parts of the entire server 11 through various interfaces and lines. By running or executing the software program and/or the module stored in the memory 112 and invoking data stored in the memory 112, the processor 113 performs the method for providing the road congestion cause according to embodiments of this application.

Figure 9:
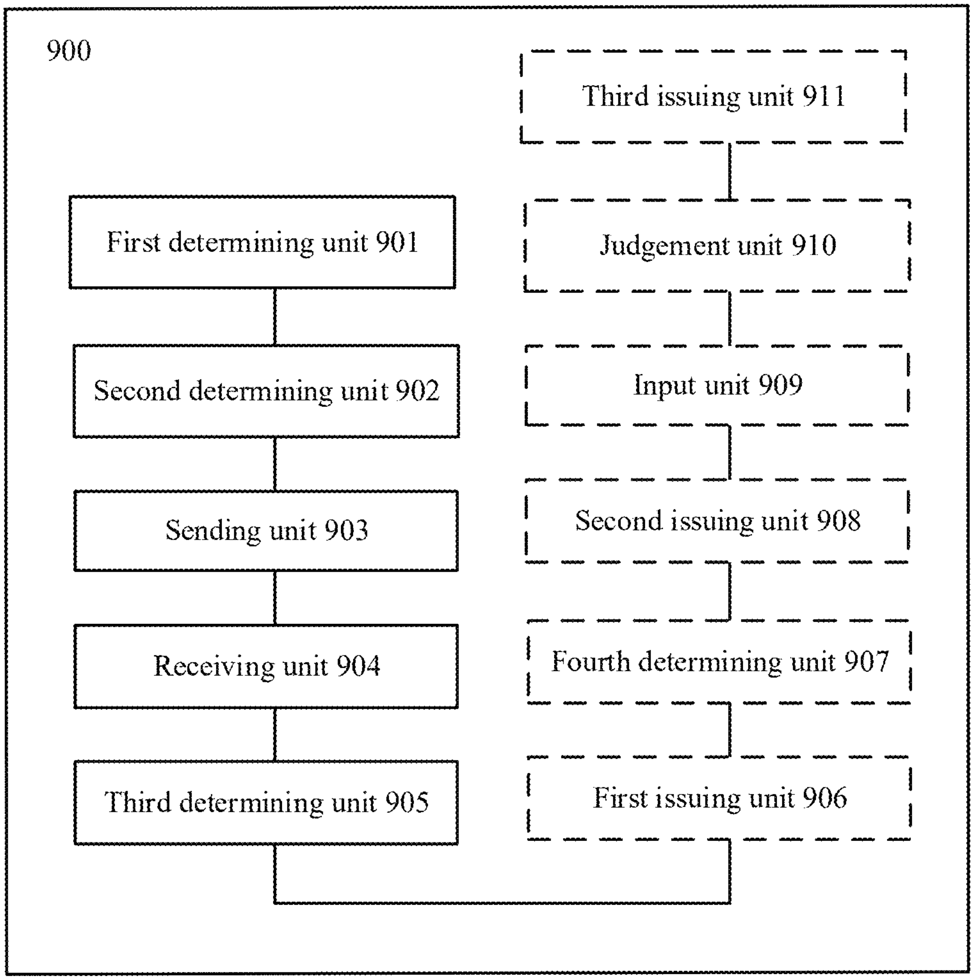
FIG. 9 shows an apparatus for providing a road congestion cause according to an embodiment of this application.

FIG. 9 shows an apparatus 900 for providing a road congestion cause according to an embodiment of this application. The apparatus is used in a server and includes:

a first determining unit 901, configured to determine a congestion point;

a second determining unit 902, configured to determine a plurality of vehicles located in a road section of a first predetermined length centered on the congestion point;

a sending unit 903, configured to send an indication message to the plurality of vehicles, where the indication message indicates the plurality of vehicles to photograph the congestion point by using a vehicle-mounted camera and upload photographed data to the server;

a receiving unit 904, configured to receive the photographed data from the plurality of vehicles; and a third determining unit 905, configured to determine the road congestion cause based on the photographed data.

In an embodiment, the indicating the plurality of vehicles to photograph the congestion point by using the vehicle-mounted camera includes: indicating at least one vehicle located in a road section of a second predetermined length centered on the congestion point to photograph the congestion point by using a front-facing camera, a side-mounted camera, and a rear-facing camera: indicating at least one vehicle located in front of the congestion point to photograph the congestion point by using a rear-facing camera: or indicating at least one vehicle located behind the congestion point to photograph the congestion point by using a front-facing camera, where the second predetermined length is shorter than the first predetermined length.

In an embodiment, the third determining unit 905 is further configured to: input the photographed data into a pre-trained first model, and determine the road congestion cause based on an output of the first model.

In an embodiment, the first model is an image recognition model, the first model is used to recognize whether the photographed data includes a feature of a plurality of predetermined features, and the plurality of predetermined features are a set of at least one predetermined feature respectively corresponding to a plurality of predetermined congestion causes. The third determining unit 905 is further configured to: determine the road congestion cause based on a degree of matching between an output of the image recognition model and at least one predetermined feature corresponding to each predetermined congestion cause.

In an embodiment, the apparatus 900 further includes a first issuing unit 906, configured to issue the road congestion cause after the road congestion cause is determined based on the photographed data.

In an embodiment, the apparatus 900 further includes: a fourth determining unit 907, configured to determine, after the photographed data is received from the plurality of vehicle devices, a congested lane based on the photographed data; and a second issuing unit 908, configured to issue information of the congested lane.

In an embodiment, the road congestion cause is a traffic accident cause, and the apparatus 900 further includes:

an input unit 909, configured to input the photographed data into a second model;

a judgement unit 910, configured to perform a traffic accident responsibility identification based on an output of the second model; and a third issuing unit 911, configured to issue the traffic accident responsibility identification.

Figure 10:
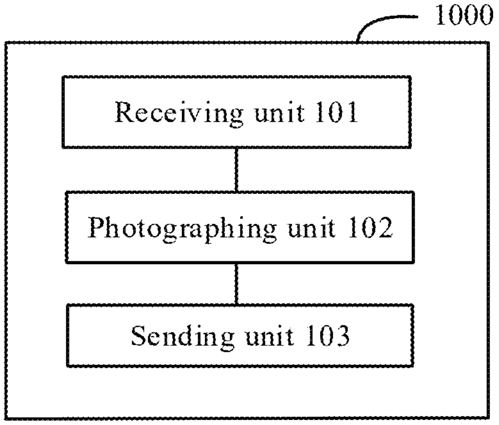
FIG. 10 shows an apparatus for providing a road congestion cause according to an embodiment of this application.

FIG. 10 shows an apparatus 1000 for providing a road congestion cause according to an embodiment of this application. The apparatus is used in a first vehicle, and the first vehicle is located in a road section of a predetermined length centered on a congestion point. The apparatus 1000 includes:

a receiving unit 101, configured to receive an indication message from a server;

a photographing unit 102, configured to photograph the congestion point based on the indication message by using a vehicle-mounted camera; and a sending unit 103, configured to send, to the server based on the indication message, photographed data that is of the congestion point and that is obtained through photographing.

Only one or more of the modules in FIG. 9 and FIG. 10 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

An embodiment of this application provides a computer-readable storage medium, where the computer-readable storage medium stores computer programs or instructions. When the computer programs or the instructions are executed in a computer, an apparatus for providing a road congestion cause is enabled to perform the method for providing the road congestion cause used in the server.

An embodiment of this application provides a computer-readable storage medium, where the computer-readable storage medium stores computer programs or instructions. When the computer programs or the instructions are executed in a computer, an apparatus for providing a road congestion cause is enabled to perform the method for providing the road congestion cause used in the vehicle.

An embodiment of this application provides a computer program product. When the computer program product runs on a processor, an apparatus for providing a road congestion cause is enabled to perform the method for providing the road congestion cause used in the server.

An embodiment of this application provides a computer program product. When the computer program product runs on a processor, an apparatus for providing a road congestion cause is enabled to perform the method for providing the road congestion cause used in the vehicle.

It should be understood that descriptions such as "first" and "second" in this specification distinguish similar concepts for simplicity of description, and do not have other limiting functions.

A person skilled in the art may clearly understand that, descriptions of embodiments provided in this application may be mutually referenced. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or some of the steps of the method embodiments may be implemented by a program instructing related hardware. The program may be stored in a computer-readable storage medium. When the program is executed, all or some of the steps of the method embodiments are performed. The foregoing storage medium includes various media that can store program code, such as a ROM, a RAM, a magnetic disk, or an optical disc.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the present application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In the several embodiments provided in this application, it should be understood that the disclosed apparatus and method may be implemented in other manners without departing from the scope of this application. For example, the described embodiments are merely examples. For example, division into the modules or units is merely logical function division and may be other division in actual embodiment. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. A person of ordinary skill in the art may understand and implement embodiments of the present application without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system for providing a road congestion cause, the system comprising at least one vehicle and a server, the server comprising at least one processor and at least one memory, wherein the at least one memory stores instructions, and the at least one processor is coupled to the at least one memory and is configured to execute the instructions to:

determine a congestion point in a road section;

determine a plurality of vehicles located in the road section of a first predetermined length centered on the congestion point;

send an indication message to the plurality of vehicles, wherein the indication message indicates to the plurality of vehicles to photograph the congestion point using a vehicle-mounted camera and to upload photograph data to the server;

receive the photograph data from the plurality of vehicles;

determine the road congestion cause based on the photograph data by inputting the photograph data into a first model, wherein the first model is a pre-trained image recognition model, and determining the road congestion cause based on an output of the first model, wherein the output of the first model includes an element identifier for each recognized element in the photograph data from a plurality of predetermined elements for each of a plurality of photographs in the photograph data, wherein each predetermined element corresponds to a training sample image in a training sample set, and wherein each element identifier corresponds to a label value of a training sample image in the training sample set; and send, to the at least one vehicle, data indicative of the road congestion cause and/or the congestion point for display; and display the data indicative of the road congestion cause and/or the congestion point on a navigation map displayed on a display screen of the at least one vehicle, wherein the first model is used to recognize whether the photograph data has at least one of a plurality of predetermined features, the plurality of predetermined features are a set of at least one predetermined feature respectively corresponding to a plurality of predetermined congestion causes, and the at least one processor is configured to execute the instructions to:

determine the road congestion cause based on a congestion cause ranking of the plurality of predetermined congestion causes based on the element identifiers output by the image recognition model for the plurality of photographs in the photograph data, wherein the congestion cause ranking is based on a percentage or ratio of a) a quantity of elements corresponding to each congestion cause in the output predetermined elements to b) all elements of the congestion cause.

2. The system according to claim 1, wherein the at least one processor is configured to execute the instructions to:

indicate to at least one vehicle located in a road section of a second predetermined length centered on the congestion point to photograph the congestion point using a front-facing camera, a side-mounted camera, and a rear-facing camera, wherein the second predetermined length is shorter than the first predetermined length.

3. The system according to claim 2, wherein the at least one processor is configured to execute the instructions to:
indicate to at least one vehicle located in front of the congestion point to photograph the congestion point using a rear-facing camera.

4. The system according to claim 1, wherein the at least one processor is configured to execute the instructions to:
indicate to at least one vehicle located behind the congestion point to photograph the congestion point using a front-facing camera.

5. The system according to claim 1, wherein the road congestion cause is a traffic accident cause, and the at least one processor is configured to execute the instructions to:
input the photograph data into a second model;
perform a traffic accident responsibility identification based on an output of the second model; and
issue the traffic accident responsibility identification.

6. An apparatus for providing a road congestion cause, comprising at least one processor and at least one memory, wherein the at least one memory stores instructions, and the at least one processor is coupled to the at least one memory and is configured to execute the instructions to:
receive an indication message from a server;
photograph a congestion point in a road section based on the indication message using a vehicle-mounted camera;
send, to the server based on the indication message, photograph data that is of the congestion point and that is obtained through photographing;
receive, from the server, data indicative of a congestion cause and the congestion point for display, the road congestion cause having been determined based on the photograph data by inputting the photograph data into a first model, wherein the first model is a pre-trained image recognition model, and determining the road congestion cause based on an output of the first model, wherein the output of the first model includes an element identifier for each recognized element in the photograph data from a plurality of predetermined elements for each of a plurality of photographs in the photograph data, wherein each predetermined element corresponds to a training sample image in a training sample set, and wherein each element identifier corresponds to a label value of a training sample image in the training sample set; and
display the data indicative of the congestion cause and/or the congestion point on a navigation map displayed on a display screen of the apparatus,
wherein the first model is used to recognize whether the photograph data has at least one of a plurality of predetermined features, the plurality of predetermined features are a set of at least one predetermined feature respectively corresponding to a plurality of predetermined congestion causes, and the at least one processor is configured to execute the instructions to:
determine the road congestion cause based on a congestion cause ranking of the plurality of predetermined congestion causes based on the element identifiers output by the image recognition model for the plurality of photographs in the photograph data,
wherein the congestion cause ranking is based on a percentage of a) a quantity of elements corresponding to each congestion cause in the output predetermined elements to b) all elements of the congestion cause.

7. A method for providing a road congestion cause, wherein the method is executed by a server and comprises:
determining a congestion point in a road section;
determining a plurality of vehicles located in the road section of a first predetermined length centered on the congestion point;
sending an indication message to the plurality of vehicles, wherein the indication message indicates to the plurality of vehicles to photograph the congestion using a vehicle-mounted camera and to upload photograph data to the server;
receiving the photograph data from the plurality of vehicles; and
determining the road congestion cause based on the photograph data by inputting the photograph data into a first model, wherein the first model is a pre-trained image recognition model, and determining the road congestion cause based on an output of the first model, wherein the output of the first model includes an element identifier for each recognized element in the photograph data from a plurality of predetermined elements for each of a plurality of photographs in the photograph data, wherein each predetermined element corresponds to a training sample image in a training sample set, and wherein each element identifier corresponds to a label value of a training sample image in the training sample set;
sending data indicative of the road congestion cause and/or the congestion point for display to at least one vehicle of the plurality of vehicles; and
displaying the data indicative of the road congestion cause and/or the congestion point on a navigation map displayed on a display screen of the at least one vehicle,
wherein the first model is used to recognize whether the photograph data has at least one of a plurality of predetermined features, the plurality of predetermined features are a set of at least one predetermined feature respectively corresponding to a plurality of predetermined congestion causes, and the method further comprises:
determining the road congestion cause based on a congestion cause ranking of the plurality of predetermined congestion causes based on the element identifiers output by the image recognition model for the plurality of photographs in the photograph data,
wherein the congestion cause ranking is based on a percentage of a) a quantity of elements corresponding to each congestion cause in the output predetermined elements to b) all elements of the congestion cause.

8. The method according to claim 7, further comprising:
indicating to at least one vehicle located in a road section of a second predetermined length centered on the congestion point to photograph the congestion point using a front-facing camera, a side-mounted camera, and a rear-facing camera, wherein the second predetermined length is shorter than the first predetermined length.

9. The method according to claim 7, further comprising:
indicating to at least one vehicle located in front of the congestion point to photograph the congestion point using a rear-facing camera.

10. The method according to claim 7, further comprising:
indicating to at least one vehicle located behind the congestion point to photograph the congestion point using a front-facing camera.

11. The method according to claim 7, wherein the road congestion cause is a traffic accident cause, and the method further comprises:

inputting the photograph data into a second model;

performing a traffic accident responsibility identification based on an output of the second model; and issuing the traffic accident responsibility identification.

* * * * *